United States Patent [19]

Neitz et al.

[11] Patent Number: 4,487,178
[45] Date of Patent: Dec. 11, 1984

[54] AIR-COMPRESSING, DIRECT-INJECTION INTERNAL COMBUSTION ENGINE

[75] Inventors: Alfred Neitz, Wendelstein; Hans Pickel; Nunzio D'Alfonso, both of Nuremburg, all of Fed. Rep. of Germany

[73] Assignee: M.A.N. Maschinenfabrik Augsburg-Nürnberg Aktiengesellschaft, Nürnberg, Fed. Rep. of Germany

[21] Appl. No.: 444,792

[22] Filed: Nov. 26, 1982

[30] Foreign Application Priority Data

Nov. 27, 1981 [DE] Fed. Rep. of Germany ....... 3147015

[51] Int. Cl.³ ............................................. F02B 23/06
[52] U.S. Cl. .................................... 123/276; 123/261; 123/262
[58] Field of Search ............... 123/276, 261, 262, 263, 123/279, 280

[56] References Cited

U.S. PATENT DOCUMENTS

| 2,151,218 | 3/1939 | Lutz | 123/276 |
| 2,858,814 | 11/1958 | Meurer | 123/276 |
| 3,195,520 | 7/1965 | Simko | 123/276 |

FOREIGN PATENT DOCUMENTS 578599 6/1959 Canada ............................. 123/262

Primary Examiner—Andrew M. Dolinar
Attorney, Agent, or Firm—Becker & Becker, Inc.

[57] ABSTRACT

An air-compressing, direct-injection internal combustion engine formed with a combustion chamber in the shape of a solid of revolution in the piston crown into which fuel is injected via only one jet through an injection nozzle arranged obliquely in the cylinder head, in the direction of the rotating air for combustion. The working of the internal combustion engine is proposed to be improved in such a way that fuel deflection liable to occur in all operating ranges, mainly at the start and at the end of injection due to the rotating air flow and, respectively, when the gas is flowing out of the combustion chamber after the top dead center position, is prevented from affecting the working of the engine and from producing erosion on the piston crown and/or cylinder head. According to the new disclosure, this is essentially achieved by having the fuel jet discharge point of the injection nozzle at top dead center of the piston lying below the piston crown level and projecting into the combustion chamber, and by having the injection nozzle surrounded, with a clearance, by a longitudinally slotted sleeve which is open at the end and projects beyond the discharge orifice (fuel emission point).

7 Claims, 4 Drawing Figures

AIR-COMPRESSING, DIRECT-INJECTION INTERNAL COMBUSTION ENGINE

BACKGROND OF THE INVENTION

The present invention relates to an air-compressing, direct injection internal combustion engine using compression ignition or spark ignition and having a combustion chamber in the shape of a solid of revolution in the piston crown; a rotary motion about the longitudinal axis of the combustion chamber is imparted by known means to the inflowing air for combustion; the fuel is injected into the combustion chamber by means of a nozzle arranged in the cylinder head off-center near the edge of the combustion chamber opening, and is injected by means of only one stream or jet in the direction of the rotating air for combustion in such a manner that a fuel film is capable of forming on the combustion chamber wall.

Such internal combustion engines, which use the method of wall deposition of the fuel, are sufficiently known from previous disclosures. They have a number of advantages, among which good fuel efficiency, low exhaust gas turbidity, and smooth running should be particularly mentioned. It was also found that the exhaust gas quality can be further improved (reduction of white and blue smoke emission and of unburned hydrocarbons) if substantially all of the small amount of fuel injected at no load and in the low speed and load range be mixed directly with the air for combustion, since the temperature of the combustion chamber wall required in these ranges for adequately fast evaporation of the filmwise deposited fuel does not exist, resulting in incomplete mixture formation and, consequently, incomplete combustion. In the upper speed and load range, however, wall deposition of the fuel has given excellent results.

It has now been discovered that the fuel which is mixed with the air at no load and in the low speed and load range will, immediately after leaving the nozzle hole, form a cloud which has little penetrating force and which is readily blown away by the rotating air. The fuel is liable to be carried onto the combustion chamber wall, into the clearance between the piston crown and the cylinder head or, where constricted combustion chambers are provided, onto the surface of the entrant section. Deposition of fuel on the relatively cold surfaces will in turn cause a deterioration of exhaust gas emissions, especially of unburned hydrocarbons.

Even at high speed and load, the main fuel jet, which is formed with a high penetrating force, it accompanied at the start and on completion of injection by small fuel clouds. Since the gas charge will rotate even faster now, these fuel clouds are deflected even more than at low speed, and are mainly carried into the spaces between the cylinder head and the piston crown. Moreover, the gas charge, immediately after top dead center, will flow with a high velocity from the combustion chamber into the quickly increasing clearance between the cylinder head and the piston crown, and entrain predominantly the fuel clouds and droplets which tend to form towards the end of the injection cycle. The fuel carried off into this space is lost to the actual combustion process, is not reached by the flame front propagating in the combustion chamber, and will burn explosively by spontaneous ignition. At the same time, these fuel clouds produce heavy erosive action on the surfaces of the piston and the cylinder head in the immediate vicinity.

This is where the invention starts, the object of which is to prevent erosion of the piston crown and cylinder head in an internal combustion engine of the type initially described as a result of fuel being deflected, and to reduce exhaust gas emission with respect to unburned hydrocarbons.

SUMMARY OF THE INVENTION

The internal combustion engine of the present invention is characterized primarily in that the discharge orifice of the injection nozzle, in the top dead center position of the piston, is below the piston crown and projects into the combustion chamber; and in that the shank of the nozzle is surrounded, with clearance, by a sleeve which is longitudinally slotted, is open at the end, and projects beyond the discharge orifice.

These features enable the objective of the present invention to be fully met in a simple manner. With the discharge orifice of the injection nozzle projecting into the combustion chamber during the injection cycle, the fuel is prevented from getting between the piston crown and the cylinder head. Fuel blown off by the rotating air is deposited predominantly on the lower projecting wall of the sleeve, and, since this area of the wall would be very hot, fuel will evaporate quickly there. In addition, the sleeve protects the injection nozzle from excessive heating, whereby the formation of carbon deposits in the discharge orifice, which would result in view of the greater projection or the nozzle into the combustion chamber, is absolutely prevented. Nor does any distortion of the injection nozzle occur because, due to the clearance between the sleeve and the nozzle body, too pronounced temperature differences cannot occur in the upper and/or lower regions of the injection nozzle. In addition to its function as a trap for fuel being blown off, the sleeve thus serves to improve mixture formation and will provide heat protection for the injection nozzle. The longitudinal slot in the sleeve ensures unconstrained good contact of the sleeve with the cooled cylinder head, even under conditions of asymmetrical temperature distribution in the sleeve. This feature prevents cracks and fractures arising either in the sleeve itself or in the cylinder head. The interspace existing between the injection nozzle and the sleeve (clearance) will be filled in the course of time by soot and carbon deposits. These deposits have an insulation effect and, as a result, provide additional heat protection.

Previous disclosures proposed heat protection by using cylindrical sleeves which surround the nozzle shank and are secured in the cylinder head or are attached to the nozzle holder; the sleeves being press-fit to contact the cylindrical neck of the nozzle projection entirely or partly (see German Patent No. 873 011). The device disclosed involves a directly cooled injection nozzle which is arranged centrally over the combustion chamber. The disadvantage of these heretofore known sleeves is that contact of the sleeves with the associated nozzle bodies continues to pass heat into the nozzle body, at least in the upper regions. Likewise, stresses are liable to arise in the sleeve in these regions during operation, resulting in cracks in the sleeve. Another disadvantage is the greater diameter which the nozzle mounting hole has to have in the cylinder head in order to permit the nozzle and the protective sleeve to be inserted and fixed. In the case of the disclosure referred to, this is of minor importance since, as already mentioned, a directly cooled injection is involved which is arranged centrally above the combustion chamber. In the case of the present invention, where the injection nozzle is arranged off-center near the edge of the combustion chamber opening obliquely to the longitudinal axis of the combustion chamber, and where heat transfer from the region of the injection nozzle is to be via the cooled surfaces of the cylinder head, the greater diameter would be more problematic for reasons of physical design. It should further be noted that in the disclosure referred to, the tip of the nozzle attachment projects into the combustion chamber. Why this is so cannot be ascertained from the specification of German Patent No. 873 011. Since, in the case of centrally arranged injection nozzles, the problem of fuel being carried off into the spaces between the cylinder head and the piston crown is less relevant due to the greater distance, it has to be assumed that having the injection nozzle project into the combustion chamber here serves some other purpose.

Seeing that an interrelationship exists between the distance of the piston from the cylinder head at the start of injection or on completion of injection, and optimum depth of projection of the nozzle tip into the combustion chamber (the distance of the piston being a function of the stroke of the internal combustion engine), it is, as a further development of the present invention, advantageous if the depth of projection of the discharge orifice into the combustion chamber—measured in a vertical direction—is at least as great as the distance of the piston crown at the end of fuel injection at rated speed and full load from the lower level of the cylinder head clearance formed at top dead center. This means that, at the end of injection, the discharge orifice is situated at least at the level of the piston crown. It may be at a lower, but not at a higher, level.

It has been discovered that the processes at the end of injection are essentially responsible for the occurrence of piston crown erosion. Therefore, one can use the end of injection at rated speed and full load as a yardstick in determining the depth of projection of the discharge orifice. This position will then also be optimum in most cases for exhaust gas emissions, which have to be especially heeded at low load and at low speed. This is because, on the one hand, the injection cycles are shorter and the start of injection and the end of injection are closer to the top dead center, while, on the other hand, gas motions (rotary and discharge motions) are much smaller because they are roughly proportional to speed.

Very good results are obtained with sleeves which project between 0.5 and 2.0 mm beyond the discharge orifice. Sleeves projecting a greater length would be liable to interfere with the rotation of the air charge.

It has proven to be desirable to have a slot in the sleeve which, in the installed cold condition, is 0.5 to 2 mm wide, and to have an outside diameter of the sleeve in the free (non-installed) condition which is 1.0 to 1.3 times the diameter of the nozzle mounting hole in the cylinder head. This affords easy installation and insertion of the sleeve in the nozzle mounting hole because the longitudinally slotted sleeve readily permits flexible deformation.

Another feature proposed is the provision of a flange on the sleeve in the region of the nozzle holder. This flange will locate the sleeve and prevent the sleeve from slipping into the cylinder.

Furthermore, it is advantageous to have the longitudinal slot (slot position) arranged in that region of the sleeve which is completely covered by the cylinder head. This also prevents fuel from impinging through the existing slot onto the surfaces liable to be corroded. In particular, this reduces the stresses in the wedge-shaped part of the cylinder head between the raked bore in which the sleeve is seated and the underside of the cylinder head as a result of unfavorable thermal deformation of the part of the sleeve projecting from the cylinder head. This eliminates the danger of cracking at this specific point, or of burn-out of the wedge-shaped part.

BRIEF DESCRIPTION OF THE DRAWINGS

This object, and other objects and advantages of the present invention, will appear more clearly from the following specification in connection with the accompanying drawings, in which.

DESCRIPTION OF THE PREFERRED EMBODIMENTS

Figure 1:
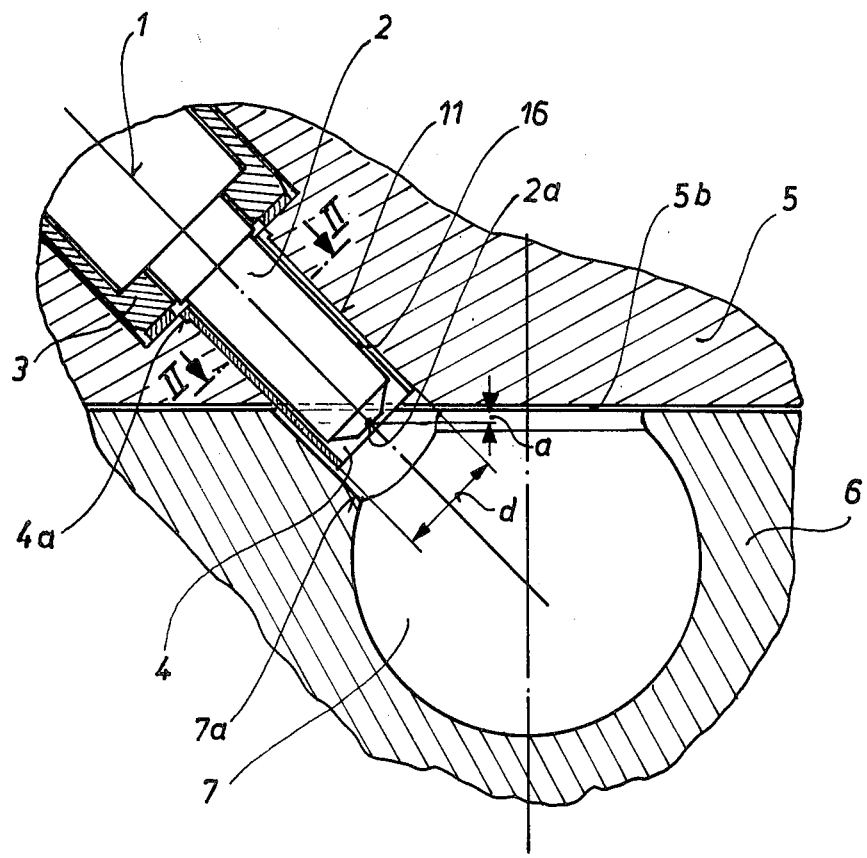
FIG. 1 is a longitudinal section through the lower part of an injection nozzle arranged in the cylinder head with a sleeve, and through the upper part of a piston with a combustion chamber positioned at top dead center in the cylinder.
Figure 2:
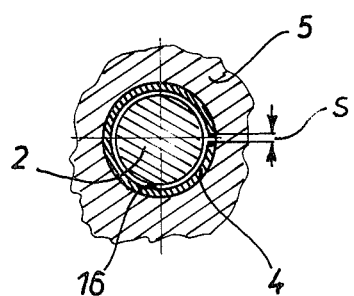
FIG. 2 is a section taken along line II—II through the injection nozzle and the sleeve according to FIG. 1.
Figure 3:
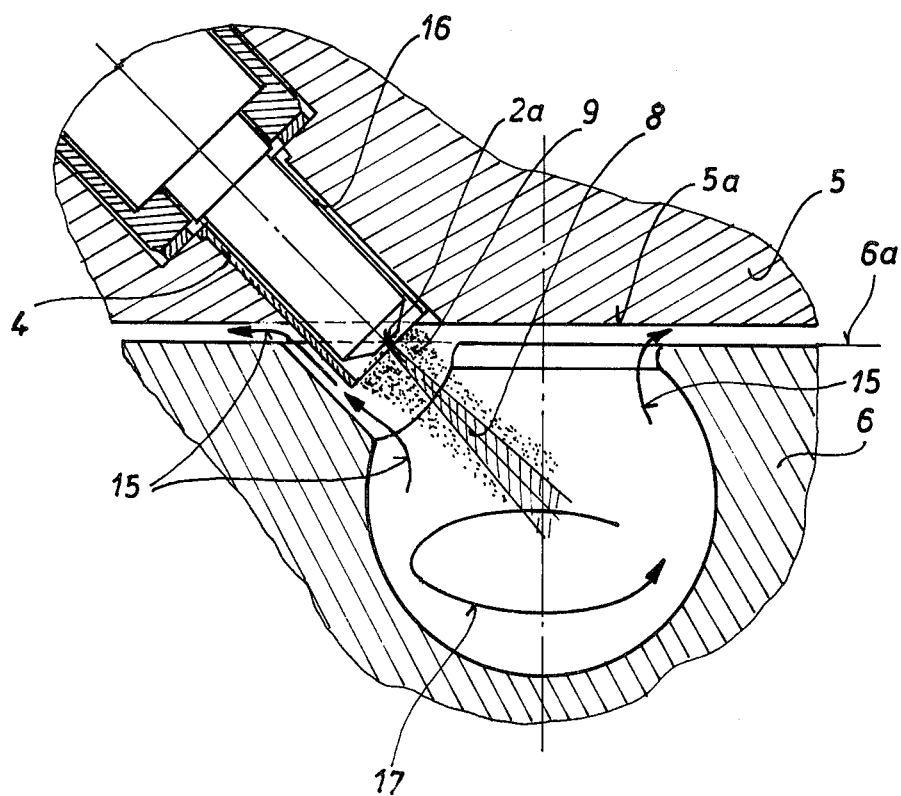
FIG. 3 is a longitudinal section as in FIG. 1 showing the gas flow after top dead center, and showing the fuel jet with the fuel cloud.

Referring now to the drawings in detail, FIGS. 1 and 3 show a spherical combustion chamber 7 which is arranged in a piston 6. The combustion chamber 7 has a constricted throat, facing the cylinder head 5, in which a connecting passage or entrance section 7a is provided which forms an oblique passage entering the combustion chamber 7 from the piston crown. In line with the entrance section 7a, a fuel injection nozzle 2 is located in the cylinder head 5. The nozzle is surrounded by a sleeve 4 with a clearance 16, and the discharge orifice 2a of the nozzle lies below the level of the cylinder head underside 5a (FIG. 3). The sleeve 4 is open at the end, and is provided with a longitudinal slot, the width s of which (see FIG. 2) is 0.5 to 2 mm in the installed cold condition. The outside diameter of the free (non-installed) sleeve 4 may be 1.3 times maximum the diameter d of the nozzle mounting hole 11 in the cylinder head 5, but a sleeve of 1.1 times the diameter d is preferred. The fact that the diameter of the sleeve 4 is greater than, or at least equal to, the nozzle mounting hole 11 ensures that the outer surface of the sleeve 4 fully contacts the surface of the cylinder head hole. As a result, the heat passing into the sleeve is effectively transferred to the cooled cylinder head surface.

An essential feature is that the sleeve 4 projects beyond the discharge orifice 2a of the injection nozzle 2. The projecting part may be between 0.5 and 2.0 mm in length. A projecting length of 1.0 mm has proven to be very advantageous.

At the top dead center position of the piston 6 (FIG. 1), the discharge orifice 2a and the cylindrical hoof-shaped part of the sleeve 4 project into the combustion chamber 7. The depth of projection "a" of the discharge orifice 2a into the combustion chamber 7—measured in a vertical direction—is at least equal to the distance between the piston crown 6a at the end of fuel injection—relative to rated speed and full load—and the lower level of the cylinder head clearance 5b at top dead center.

Where yet further improvement of exhaust gas emission is desired (this applies, for instance, to lighter vehicles, such as passenger cars in the low load range), it is also conceivable to have the discharge orifice project further into the combustion chamber, and to fix the depth of projection "a" as a function of the distance of the piston at the start of injection, or of a value between the start of injection and the end of injection.

Also shown in FIG. 1 is the nozzle center line 1 which, in this case, coincides with the nozzle orifice axis. This need not always be the case. Furthermore, the numeral 3 designates the nozzle holder. In the region of this nozzle holder, the sleeve 4 is formed with a flange 4a which locates the sleeve.

FIG. 3 shows the position of the piston 6 after the top dead center position and/or towards the end of the injection cycle. It can be seen that fuel mist 9, or fuel particles without momentum, exist around the injected main fuel jet 8 and—due to the rotating air 17—preferably impinge and evaporate on the cylindrical hoof-shaped part of the hot sleeve wall. The arrows 15 show the radial gas movement which develops after top dead center.

It has been discovered that this radial gas movement is the chief cause of erosion of the piston crown and/or cylinder head because it carries along the fuel clouds or droplets which form towards the end of the injection cycle, and carries them into the clearance between the cylinder head and the piston crown. Since, in the case of the present invention, the discharge orifice 2a is still at least at the level of the piston crown 6a (and may even be at a lower level) at the end of the injection cycle, this disadvantage does not arise. This also applies at the start of injection before top dead center although, in most cases, the discharge orifice 2a of the injection nozzle 2 will then still be above the level of the piston crown 6a. In this case, the squish or compressive effect, which causes air to flow into the combustion chamber at high velocity, will to a large extent prevent fuel from being carried into the spaces between the piston crown and the cylinder head.

Figure 4:
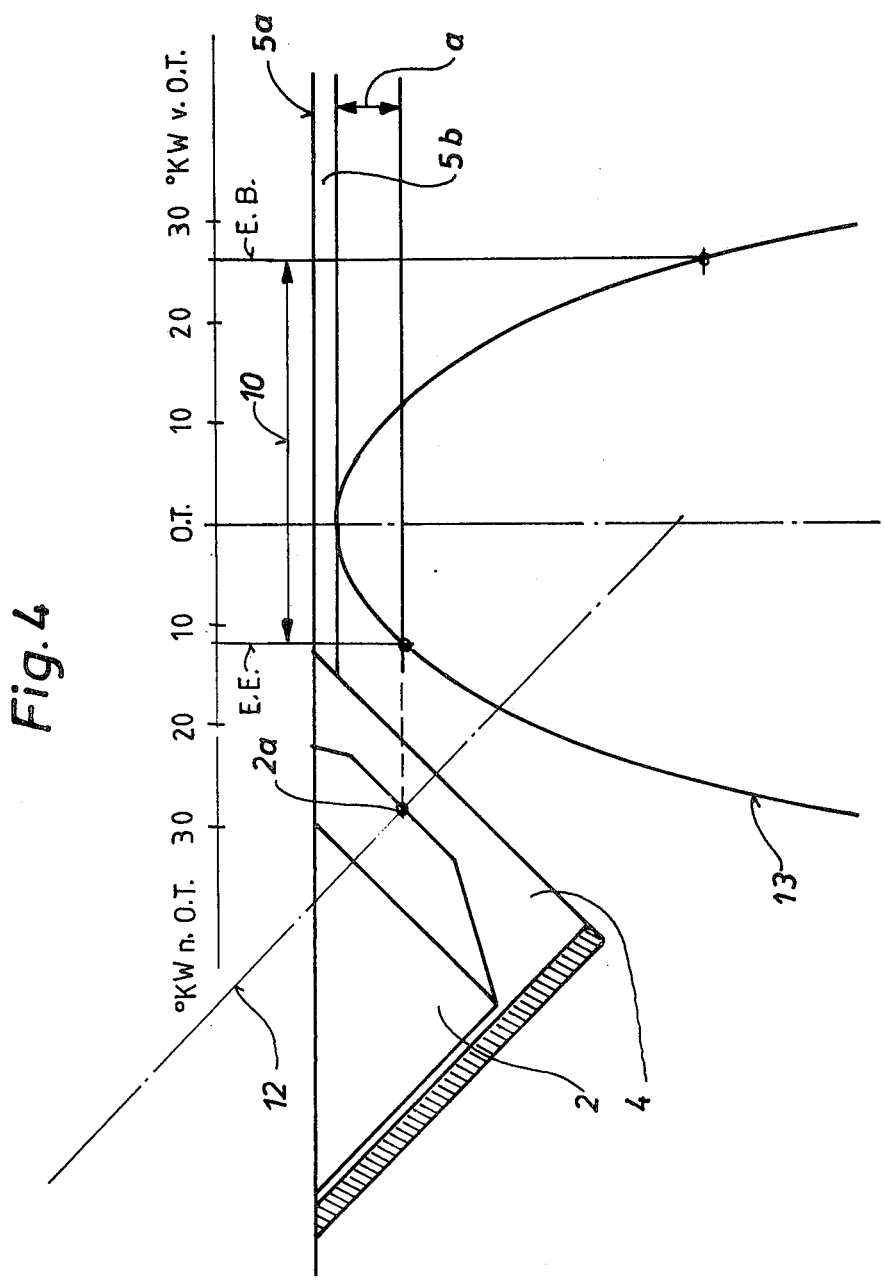
FIG. 4 is a graph plotting the movement of the piston during the injection cycle, and showing the depth of projection of the discharge orifice (jet emission point) into the combustion chamber (enlarged).

Referring to the graph of FIG. 4, the piston travel 13 is plotted against degrees of crank angle (°KW) in the form of a parabola. In the example shown, fuel injection starts at 26° before top dead center (°KW v.O.T.) and ends at 12° after top dead center (°KW n. O.T.); the complete injection cycle at full load is designated by the numeral 10. It can also be seen that, at the end of injection, the piston is at a distance "a" from the cylinder head clearance 5b. This distance "a" corresponds to the depth of projection of the fuel jet discharge orifice 2a into the combustion chamber when the piston is at top dead center. In the example shown, the depth of projection "a" is approximately 1.3 mm, and the sleeve 4 projects about 1 mm beyond the discharge orifice 2a. The axis of the discharge orifice is designated by the numeral 12 in FIG. 4.

Finally, it should be mentioned that it is not necessary, due to the provision of the sleeve, to increase the diameter of the hole in the cylinder head for mounting the nozzle. Instead, the nozzle shank is made more slender. This reduction of the material in the region of the nozzle shank automatically (due to the smaller exposed area and the internal fuel flow) brings about a further reduction in temperature at the nozzle.

The present invention is, of course, in no way restricted to the specific disclosure of the specification and drawings, but also encompasses any modifications within the scope of the appended claims.

What we claim is:

1. An air-compressing, direct-injection internal combustion engine which has at least one piston/cylinder unit including:
    a piston having a crown region and a crown surface which faces the underside of a head of an associated cylinder, said piston being provided in said crown region thereof with a combustion chamber having the shape of a solid of revolution, with air for combustion being introduced into said combustion chamber and having imparted thereto a rotary motion about the longitudinal axis of said combustion chamber;
    a fuel injection nozzle having a shank being arranged eccentrically in said cylinder head in the vicinity of the edge of the opening of said combustion chamber for injecting a single jet of fuel into said combustion chamber in the direction toward said rotating air for combustion in such a way that a film of fuel can form on the wall of said combustion chamber; said injection nozzle having a discharge orifice, with said injection nozzle being disposed in said cylinder head in such a way that in the top dead center position of said piston, said discharge orifice is located below said piston crown surface and projects into said combustion chamber; and
    a sleeve is provided which is disposed about said shank of said injection nozzle with clearance, is provided with a longitudinal slot, is open at its ends, and projects beyond said discharge orifice in the direction toward said combustion chamber.

2. An internal combustion engine according to claim 1, in which the depth of projection of said discharge orifice into said combustion chamber, measured in a vertical direction, is at least as great as the distance of said piston crown surface, at the end of fuel injection and at rated speed and full load, from the lower level of the clearance formed between said piston crown surface and the underside of said cylinder head at the top dead center position of said piston.

3. An internal combustion engine according to claim 1, in which said sleeve projects beyond said discharge orifice by between 0.5 and 2 mm.

4. An internal combustion engine according to claim 3, in which, in the installed cold condition, the width of said longitudinal slot in said sleeve is from 0.5 to 2 mm.

5. An internal combustion engine according to claim 4, in which said cylinder head is provided with a nozzle mounting hole for receiving said sleeve and said injection nozzle therein, and in which the outer diameter of said sleeve in the free, non-installed state thereof is 1.0 to 1.3 times the diameter of said nozzle mounting hole.

6. An internal combustion engine according to claim 5, in which said sleeve is provided with a flange at that end thereof remote from said combustion chamber.

7. An internal combustion engine according to claim 5, in which said longitudinal slot of said sleeve is completely covered by said cylinder head.

* * * * *